US009464556B2

(12) United States Patent
Niemann et al.

(10) Patent No.: US 9,464,556 B2
(45) Date of Patent: Oct. 11, 2016

(54) HIGH-TEMPERATURE SENSOR FOR ARRANGEMENT IN A METAL TUBE, ESPECIALLY INSIDE THE EXHAUST GAS SYSTEM OF AN INTERNAL COMBUSTION ENGINE

(75) Inventors: Thomas Niemann, Delmenhorst (DE); Torsten Eggers, Bremen (DE)

(73) Assignee: HELLA KGAA HUECK & CO., Lippstadt (DE)

( * ) Notice: Subject to any disclaimer, the term of this patent is extended or adjusted under 35 U.S.C. 154(b) by 490 days.

(21) Appl. No.: 14/002,724

(22) PCT Filed: Feb. 28, 2012

(86) PCT No.: PCT/DE2012/000188
§ 371 (c)(1),
(2), (4) Date: Sep. 20, 2013

(87) PCT Pub. No.: WO2012/116683
PCT Pub. Date: Sep. 7, 2012

(65) Prior Publication Data
US 2014/0010261 A1    Jan. 9, 2014

(30) Foreign Application Priority Data

Mar. 1, 2011    (DE) .................. 10 2011 012 681

(51) Int. Cl.
*F01N 11/00*    (2006.01)
*G01K 1/14*    (2006.01)

(52) U.S. Cl.
CPC ............ *F01N 11/002* (2013.01); *G01K 1/143* (2013.01); *F01N 2560/06* (2013.01); *G01K 2205/04* (2013.01)

(58) Field of Classification Search
CPC .... G01K 1/143; G01K 1/14; G01K 2205/00; G01K 2205/04; F01N 11/002; F01N 2560/06

USPC .......................................................... 374/120
See application file for complete search history.

(56) References Cited

U.S. PATENT DOCUMENTS

| 2,587,916 | A | | 3/1952 | Squier |
| 2,638,784 | A | | 5/1953 | Cesaro |
| 3,906,721 | A | * | 9/1975 | Micheli .................... F01N 3/20 422/95 |

(Continued)

FOREIGN PATENT DOCUMENTS

| CN | 1715847 | 1/2006 |
| DE | 102 11 029 A1 | 10/2002 |

(Continued)

OTHER PUBLICATIONS

An Office Action from the corresponding Chinese Application No. 201280011218.6 mailed Nov 6, 2015, 7 pages.

*Primary Examiner* — Lisa Caputo
*Assistant Examiner* — Philip Cotey
(74) *Attorney, Agent, or Firm* — Muncy, Geissler, Olds & Lowe PC

(57) ABSTRACT

The invention relates to a high-temperature sensor comprising contact wires in a metal tube, preferably a bent metal tube for arrangement especially inside the exhaust gas system of an internal combustion engine, and spacer bodies distributed in rows along the contact wires so as to maintain the contact wires at a predetermined distance to the inner wall of the metal tube. According to the invention, every spacer body is approximately ovoid, the diameter of the center portion of the egg being not wider than the inside width of the as yet unbent metal tube. The spacer bodies are injection-molded polymer ceramic parts molded onto the contact wires.

6 Claims, 2 Drawing Sheets

(56) References Cited

U.S. PATENT DOCUMENTS

Figure 1:
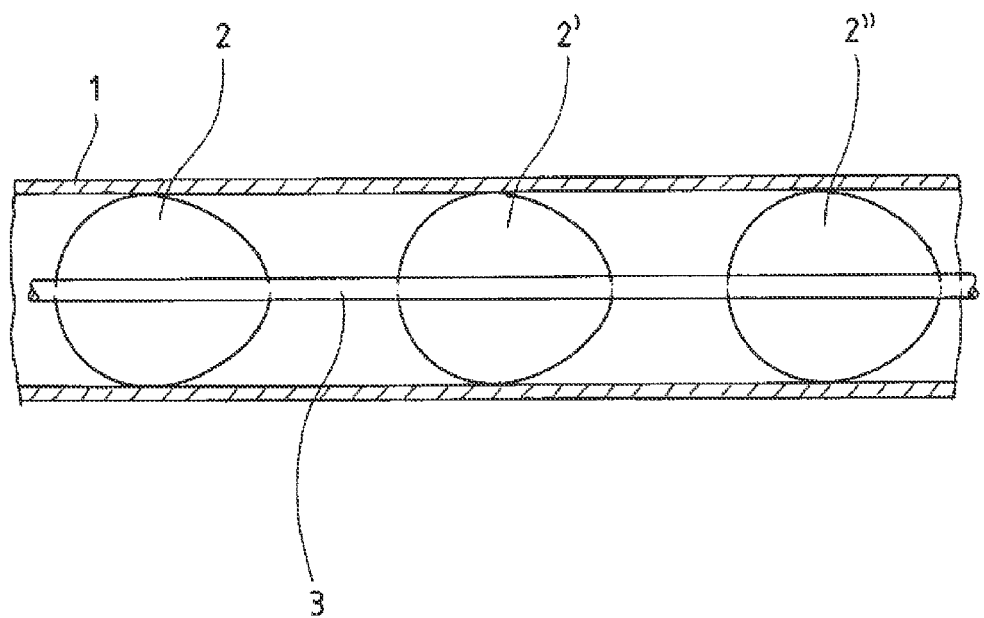

| | | | | |
|---|---|---|---|---|
| 4,934,831 A | * | 6/1990 | Volbrecht | G01K 1/08 374/163 |
| 7,338,202 B1 | * | 3/2008 | Kapat | B81C 1/0069 374/10 |
| 2002/0048310 A1 | | 4/2002 | Heuser | |
| 2004/0109651 A1 | * | 6/2004 | Lancaster | G01K 11/32 374/E11.015 |

FOREIGN PATENT DOCUMENTS

| | | |
|---|---|---|
| DE | 10 2005 030 643 A1 | 2/2006 |
| DE | 10 2008 056 553 A1 | 5/2010 |
| DE | 10 2009 008 572 A1 | 8/2010 |
| DE | 10 2009 050 433 B3 | 10/2010 |
| JP | 55-67629 A | 5/1980 |
| JP | 5-72049 A | 3/1993 |
| JP | 2002-062193 A | 2/2002 |

* cited by examiner

HIGH-TEMPERATURE SENSOR FOR ARRANGEMENT IN A METAL TUBE, ESPECIALLY INSIDE THE EXHAUST GAS SYSTEM OF AN INTERNAL COMBUSTION ENGINE

The invention relates to a high-temperature sensor comprising contact wires in a metal tube, preferably in a bent metal tube for arrangement especially inside the exhaust gas system of an internal combustion engine, and spacer bodies distributed in rows along the contact wires so as to maintain the contact wires at a predetermined distance to the inner wall of the metal tube.

A temperature sensor is provided in DE 10 2005 030 643 A1. DE 102 11 029 A1 describes a temperature sensor.

Internal combustion engines for vehicles, but also other internal combustion engines, have a plurality of high-temperature sensors for maintaining exhaust gas limiting values and also for protecting components in the exhaust gas system of the internal combustion engine. These are accommodated in an associated metal tube as a so-called "contact group".

If the metal tube is to be curved, which corresponds to a frequently used 90° variant of high-temperature sensors, the metal tube provided with the contact group positioned therein is curved by a bending process. On the one hand, the entire contact group must have sufficient play so that it can be joined without any problems, on the other hand any play still present after the bending must be eliminated so that no failure rupture of the arrangement of high-temperature sensors, in particular their contact wires, can take place due to the enormous vibrations during operation of the internal combustion engine.

Arrangements are known which, for example, are encased by quartz glass silk and embedded in a filling of aluminium oxide powder.

The encasing with quartz glass silk and the subsequent embedding in the aluminium oxide powder filling requires corresponding production processes which lead to corresponding increases in cost during the preparation of high-temperature sensors.

It is the object of the invention to simplify the structure or the arrangement of a high-temperature sensor, in particular in the 90° variant, from the production technology viewpoint.

This object is solved according to the invention by the features of claim 1.

Further developments and advantageous embodiments are obtained from the features of claims 2 and 3.

The high-temperature sensor according to the invention comprising contact wires in a metal tube for arrangement especially inside the exhaust gas system of an internal combustion engine, where spacer bodies distributed in rows along the contact wires are provided, is characterised in that each spacer body is approximately ovoid. This particular shape of the spacer body where the diameter of the centre portion of the egg is no wider than the inside width of the as yet unbent metal tube enables completely automatic manufacture of the entire installation group comprising the high-temperature sensor with contact wires as well as the spacer bodies distributed in rows along the contact wires.

Since the diameter of the centre portion of the egg is no wider than the inside width of the as yet unbent metal tube, the contact group of contact wires, spacer bodies and high-temperature sensor can be joined without any problem.

The spacer bodies are particularly advantageously injection-moulded polymer ceramic parts moulded onto the contact wires. Naturally other equivalent materials are also suitable in order to manufacture the spacer bodies automatically therefrom in the injection moulding process. Any insertion parts which can be overmoulded can be disposed in injection moulds.

As a result of their particular shape, the ovoid spacer bodies have an upper radius which is smaller than the lower radius. During the bending deformation of the metal tube, the stretching of one of the walls of the metal tube and the compression of the respectively other wall, results in the rotation of the ovoid spacer bodies in such a manner that the radially interior flank abuts against the smaller radius of the metal tube and the outer flank abuts against the larger radius. A compensation of the different radii of the metal tube is therefore given. This compensation leads to a clamping of the spacer bodies inside the metal tube so that the spacer bodies are braced in the tube. A filling with aluminium oxide powder or an encasing with a quartz glass silk is eliminated. The manufacturing costs are thereby reduced. It is of not inconsiderable importance for the invention that the contact group is initially drawn into the metal tube and only then does the bending process take place as a result of which the metal tube acquires the predetermined curvature.

As a result, during the bending compensation of the play is achieved as a result of the variation of the fits between the widths of the metal tube and the diameters of the spacer bodies of the contact group caused by the manufacture.

Preferably the outline of each spacer body corresponds to an ovoid line of a cubic equation. For example, an equation $2y^2=(x-1)(x-2)(x-3)$ can be applied.

Other ovoid lines which are suitable for bringing about the previously described clamping are also suitable for forming spacer bodies.

Figure 2:
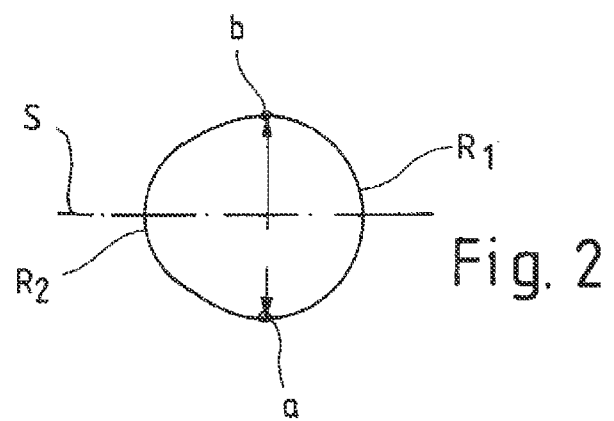

An exemplary embodiment of the invention from which further inventive features are obtained is shown in the drawings. In the figures:

FIG. 1: shows a sectional view of a metal tube with spacer bodies distributed in rows along contact wires;

FIG. 2: shows a side view of a spacer body according to FIG. 1; and

Figure 3:
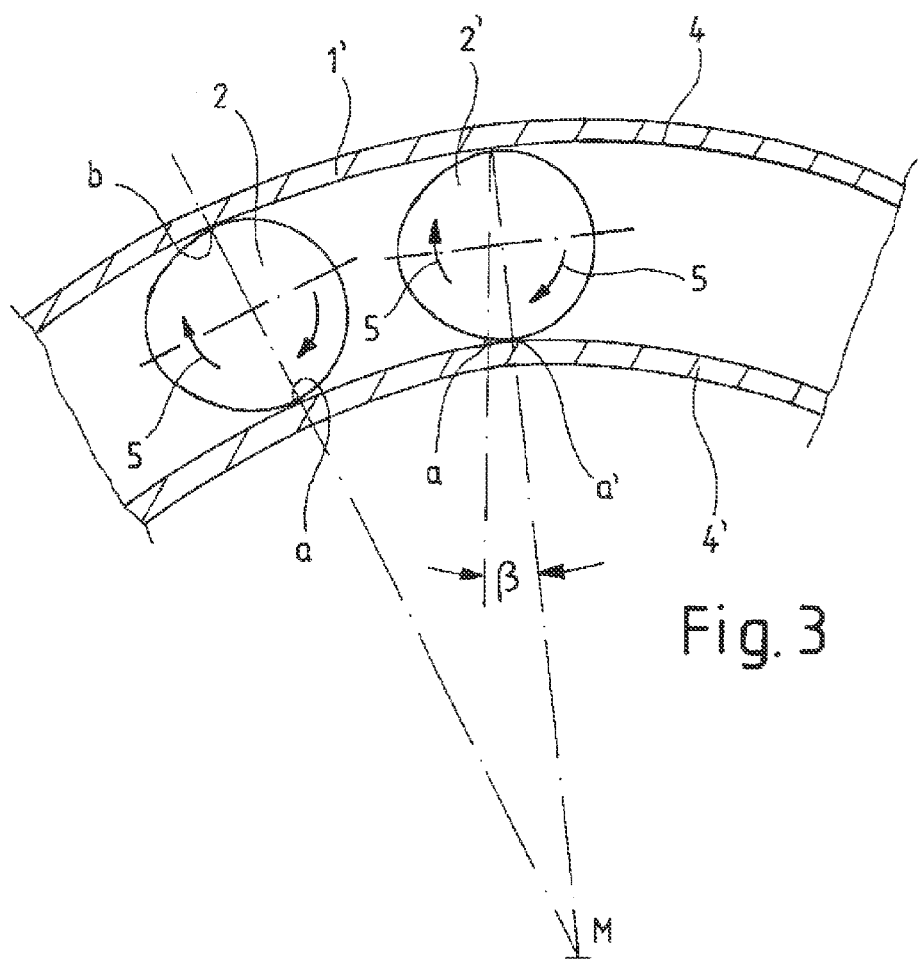

FIG. 3: shows a section of the curved metal tube compared with FIG. 1 with spacer bodies located therein FIG. 1 shows a side view of a metal tube 1 into which a type of chain of pearls of spacer bodies 2, 2', 2" interconnected by contact wires 3 is drawn.

The number of spacer bodies of such a contact group can be arbitrary depending on the length of the contact wires but always at least two spacer bodies form a contact group.

The contact wires are connected to a sensor not shown here, for example, a high-temperature sensor which delivers measured values via the contact wires to an electronics system not shown further in which the measured values are evaluated.

The metal tube 1 can, for example, lead via an associated hole into an exhaust gas system of an internal combustion engine in order to tap corresponding exhaust gas values via the sensor located at one end of the metal tube.

The metal tube 1 preferably consists of chromium-nickel steel (e.g. Inconel 601) which is and remains corrosion-resistant even at high temperatures.

In the contact group shown in FIG. 1 three spacer bodies 2, 2', 2" are shown which are interconnected by contact wires 3. These normally comprise two contact wires which run approximately parallel to one another onto which the spacer bodies 2, 2', 2" are threaded for example.

Each spacer body 2, 2', 2" is a shaped injection-moulded part made of polymer ceramic which is configured to be ovoid. In this case the diameter of the centre portion of the egg is no wider than the inside width of the as yet unbent metal tube.

FIG. 2 shows a side view of a spacer body 2 which has an ovoid shape where "S" denotes the axis of symmetry of the ovoid body. An egg is narrower at one end and in addition to the feature of a single axis of symmetry "S", also shows the feature of different radii, for example, R1 and R2 within an ovoid line predefining the outline.

If a spacer body having the shape apparent from FIG. 2 is inserted into the metal tube 1 according to FIG. 1, the contact points a and b touch the inner wall surface of the metal tube 1, where the contact points a and b have the spacing c, which approximately corresponds to the inside width of the metal tube 1.

In the spacer shown in FIG. 2, the radius R1 is greater than the radius R2.

FIG. 3 shows the metal tube 1' in curved shape. The spacer bodies in the curved metal tube 1' are here designated by 2 and 2'.

Since the outer wall 4 of the metal tube 1' is stretched into the envisaged curvature during bending whilst at the same time the inner wall 4' is compressed, the spacer body 2' has rotated in the direction of the short arcuate arrow 5 with respect to the spacer body 2. As a result of this rotation through the angle 13, the contact point a of the spacer body 2' has migrated from its previous position a' and is now located in a position in which some play would be given between spacer body 2' and the compressed inner wall surface of the metal tube 1'. Since the spacer body 2' has rotated however, its larger radius R1 comes to abut with the inner wall surface of the metal tube which runs around the curvature centre point m with a smaller radius, with the result that the braced contact at point a' is re-established.

The invention claimed is:

1. A high-temperature sensor comprising:
    contact wires in a metal tube, for arrangement inside an exhaust gas system of an internal combustion engine, and
    spacer bodies distributed in rows along the contact wires so as to maintain the contact wires at a predetermined distance to an inner wall of the metal tube,
  each spacer body being ovoid for compensation of the different radii of the metal tube during a bending deformation of the metal tube, where this compensation leads to a clamping of the spacer bodies inside the metal tube, where a diameter of a center portion of the spacer body is not wider than an inside width of the metal tube.

2. The high-temperature sensor according to claim 1, wherein the spacer bodies are injection-moulded polymer ceramic parts moulded onto the contact wires.

3. The high-temperature sensor according to claim 1, wherein the outline of each spacer body corresponds to an ovoid line of a cubic equation.

4. A motor vehicle comprising an internal combustion engine and an exhaust gas system and at least one high-temperature sensor according to claim 1.

5. The high-temperature sensor according to claim 3, wherein the cubic equation is $2y^2=(x-1)(x-2)(x-3)$.

6. The high-temperature sensor according to claim 1, wherein an axis of symmetry of each spacer body is coaxial with a longitudinal direction of a corresponding contact wire.

* * * * *